(12) United States Patent
Sullivan et al.

(10) Patent No.: US 10,561,904 B2
(45) Date of Patent: Feb. 18, 2020

(54) GOLF BALLS HAVING METAL-CONTAINING PLASTICIZED THERMOPLASTIC INNER CORES AND THERMOSET OUTER CORES

(71) Applicant: Acushnet Company, Fairhaven, MA (US)

(72) Inventors: Michael J. Sullivan, Old Lyme, CT (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 16/139,080

(22) Filed: Sep. 23, 2018

(65) Prior Publication Data

US 2019/0022469 A1    Jan. 24, 2019

Related U.S. Application Data

(60) Division of application No. 15/387,911, filed on Dec. 22, 2016, now Pat. No. 10,080,926, which is a continuation-in-part of application No. 14/711,962, filed on May 14, 2015, now Pat. No. 9,878,213, which is a continuation-in-part of application No. 13/606,099, filed on Sep. 7, 2012, now Pat. No. 9,095,746.

(51) Int. Cl.
*A63B 37/04* (2006.01)
*A63B 37/06* (2006.01)
*A63B 37/00* (2006.01)

(52) U.S. Cl.
CPC ...... *A63B 37/0051* (2013.01); *A63B 37/0024* (2013.01); *A63B 37/0033* (2013.01); *A63B 37/0039* (2013.01); *A63B 37/0043* (2013.01); *A63B 37/0044* (2013.01); *A63B 37/0045* (2013.01); *A63B 37/0047* (2013.01); *A63B 37/0054* (2013.01); *A63B 37/0062* (2013.01); *A63B 37/0063* (2013.01); *A63B 37/0064* (2013.01); *A63B 37/0066* (2013.01); *A63B 37/0075* (2013.01); *A63B 37/0076* (2013.01); *A63B 37/0091* (2013.01); *A63B 37/0092* (2013.01)

(58) Field of Classification Search
USPC .................................. 473/351–378
See application file for complete search history.

(56) References Cited

U.S. PATENT DOCUMENTS 4,625,964 A    12/1986 Yamada
5,048,838 A    9/1991 Chikaraishi et al.
(Continued)

*Primary Examiner* — Alvin A Hunter
(74) *Attorney, Agent, or Firm* — Daniel W. Sullivan

(57) ABSTRACT

Multi-piece golf balls containing a dual-layered core structure are provided. The core structure includes a small, heavy inner core (center) having a relatively high specific gravity, and a surrounding outer core layer. The layers of the core structure may have different hardness gradients. The center of the core comprises a metal material such as copper, steel, brass, tungsten, titanium, aluminum, and alloys thereof preferably dispersed in a thermoplastic polymeric matrix. Different plasticizers such as fatty acid esters may be used. The outer core layer is preferably formed from a thermoset composition such as polybutadiene. The resulting ball has high resiliency and good spin.

11 Claims, 2 Drawing Sheets

(56) References Cited

U.S. PATENT DOCUMENTS

| | | | |
|---|---|---|---|
| 5,104,126 A | 4/1992 | Gentiluomo | |
| 5,482,285 A | 1/1996 | Yabuki et al. | |
| 6,277,034 B1 | 8/2001 | Nesbitt et al. | |
| 6,494,795 B2 | 12/2002 | Sullivan | |
| 6,500,076 B1 | 12/2002 | Morgan et al. | |
| 6,692,380 B2 | 2/2004 | Sullivan et al. | |
| 6,916,254 B2 * | 7/2005 | Ladd | A63B 37/0003 473/376 |
| 6,986,717 B2 | 1/2006 | Morgan et al. | |
| 7,001,287 B2 * | 2/2006 | Ladd | A63B 37/0003 473/376 |
| 7,094,160 B2 * | 8/2006 | Ladd | A63B 37/0003 473/376 |
| 7,195,569 B2 * | 3/2007 | Ladd | A63B 37/0003 473/376 |
| 7,410,429 B1 | 8/2008 | Bulpett et al. | |
| 7,427,242 B1 * | 9/2008 | Sullivan | A63B 37/0003 473/373 |
| 7,537,529 B2 | 5/2009 | Bulpett et al. | |
| 7,537,530 B2 | 5/2009 | Bulpett et al. | |
| 7,582,025 B2 * | 9/2009 | Sullivan | A63B 37/0003 473/373 |
| 7,591,742 B2 | 9/2009 | Sullivan et al. | |
| 7,621,825 B2 * | 11/2009 | Sullivan | A63B 37/0003 473/376 |
| 7,744,489 B2 | 6/2010 | Sullivan et al. | |
| 7,744,490 B2 | 6/2010 | Sullivan et al. | |
| 7,749,107 B2 * | 7/2010 | Sullivan | A63B 37/0059 264/134 |
| 7,815,526 B2 | 10/2010 | Sullivan et al. | |
| 7,946,934 B2 | 5/2011 | Sullivan et al. | |
| 8,137,214 B2 | 3/2012 | Sullivan et al. | |
| 8,152,655 B2 | 4/2012 | Comeau et al. | |
| 9,526,948 B2 * | 12/2016 | Sullivan | A63B 37/0076 |
| 9,550,094 B2 * | 1/2017 | Sullivan | A63B 37/0051 |
| 9,764,195 B2 * | 9/2017 | Sullivan | A63B 37/0039 |
| 9,993,693 B2 * | 6/2018 | Sullivan | A63B 37/0076 |
| 10,080,926 B2 * | 9/2018 | Sullivan | C08K 3/10 |
| 10,137,333 B2 * | 11/2018 | Sullivan | A63B 37/0076 |
| 10,220,262 B2 * | 3/2019 | Sullivan | A63B 37/0039 |
| 2004/0067801 A1 | 4/2004 | Nesbitt et al. | |
| 2010/0099517 A1 | 4/2010 | Comeau et al. | |
| 2010/0144466 A1 | 6/2010 | Sullivan et al. | |
| 2010/0227707 A1 | 9/2010 | Sullivan et al. | |
| 2011/0275456 A1 | 11/2011 | Sullivan et al. | |
| 2011/0312441 A1 | 12/2011 | Sullivan et al. | |
| 2012/0122610 A1 | 5/2012 | Sullivan et al. | |

* cited by examiner

GOLF BALLS HAVING METAL-CONTAINING PLASTICIZED THERMOPLASTIC INNER CORES AND THERMOSET OUTER CORES

CROSS-REFERENCE TO RELATED APPLICATIONS

This application is a divisional of co-pending, co-assigned U.S. patent application Ser. No. 15/387,911 filed Dec. 22, 2016, now allowed, which is a continuation-in-part of co-assigned U.S. patent application Ser. No. 14/711,962, filed May 14, 2015, now U.S. Pat. No. 9,878,213 with an issue date of Jan. 30, 2018, which is a continuation-in-part of co-assigned U.S. patent application Ser. No. 13/606,099, filed Sep. 7, 2012, now U.S. Pat. No. 9,095,746 with an issue date of Aug. 4, 2015, the entire disclosures of which are hereby incorporated by reference.

BACKGROUND OF THE INVENTION

Field of the Invention

The present invention generally relates to multi-piece golf balls having a solid core of at least two layers and cover of at least one layer. In one embodiment, the ball contains a dual-layered core having a small, heavy inner core (center) and surrounding outer core layer. The center comprises a metal material and the outer core layer comprises a thermoset material such as polybutadiene rubber. In another embodiment, the ball contains a multi-layered core having a small, heavy inner core (center), intermediate core layer, and surrounding outer core layer. The core layers have different hardness gradients and specific gravity values to provide finished balls having high resiliency and spin-control properties.

BRIEF REVIEW OF THE RELATED ART

Multi-piece, solid golf balls having a solid inner core protected by a cover are used today by recreational and professional golfers. The golf balls may have single-layered or multi-layered cores. Normally, the core layers are made of a highly resilient natural or synthetic rubber material such as styrene butadiene, polybutadiene, poly(cis-isoprene), or poly(trans-isoprene); or highly neutralized ethylene acid copolymers (HNPs). The covers may be single or multi-layered and made of a durable material such as HNPs, polyamides, polyesters, polyurethanes, or polyureas. Manufacturers of golf balls use different constructions (for example, three-piece, four-piece, and five-piece balls) to impart specific properties and features to the balls.

The core is the primary source of resiliency for the golf ball and is often referred to as the "engine" of the ball. The resiliency or coefficient of restitution ("COR") of a golf ball (or golf ball component, particularly a core) means the ratio of a ball's rebound velocity to its initial incoming velocity when the ball is fired out of an air cannon into a rigid plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls (or cores) with a high rebound velocity have a relatively high COR value. Such golf balls rebound faster, retain more total energy when struck with a club, and have longer flight distances as opposed to balls with lower COR values. Ball resiliency and COR properties are particularly important for long distance shots. For example, balls having high resiliency and COR values tend to travel a far distance when struck by a driver club from a tee. The spin rate of the ball also is an important property. Balls having a relatively high spin rate are particularly desirable for relatively short distance shots made with irons and wedge clubs. Professional and highly skilled recreational golfers can place a back-spin on such balls more easily. By placing the right amount of spin and touch on the ball, the golfer has better control over shot accuracy and placement. This is particularly important for approach shots near the green and helps improve scoring performance.

Over the years, golf ball manufacturers have looked at adjusting the density or specific gravity among the multiple layers of the golf ball to control its spin rate. In general, the total weight of a golf ball has to conform to weight limits set by the United States Golf Association ("USGA"). Although the total weight of the golf ball is mandated, the distribution of weight within the ball can vary. Redistributing the weight or mass of the golf ball either towards the center of the ball or towards the outer surface of the ball changes its flight and spin properties.

For example, the weight can be shifted towards the center of the ball to increase the spin rate of the ball as described in Yamada, U.S. Pat. No. 4,625,964. In the '964 patent, the core composition preferably contains 100 parts by weight of polybutadiene rubber; 10 to 50 parts by weight of zinc acrylate or zinc methacrylate; 10 to 150 parts by weight of zinc oxide; and 1 to 5 parts by weight of peroxide as a cross-linking or curing agent. The inner core has a specific gravity of at least 1.50 in order to make the spin rate of the ball comparable to wound balls. The ball further includes a cover an intermediate layer disposed between the core and cover, wherein the intermediate layer has a lower specific gravity than the core.

Chikaraishi et al., U.S. Pat. No. 5,048,838 discloses a three-piece golf ball containing a two-piece solid core and a cover. The inner core has a diameter in the range of 15-25 mm, a weight of 2-14 grams, a specific gravity of 1.2 to 4.0, and a hardness of 55-80 JISC. The specific gravity of the outer core layer is less than the specific gravity of the inner core by 0.1 to 3.0. less than the specific gravity of the inner core. The inner and outer core layers are formed from rubber compositions.

Gentiluomo, U.S. Pat. No. 5,104,126 discloses a three-piece ball with a dense inner core made of steel, lead, brass, zinc, copper, and a filled elastomer, wherein the core has a specific gravity of at least 1.25. The inner core is encapsulated by a lower density syntactic foam composition, and the core construction is encapsulated by an ionomer cover.

Yabuki et al., U.S. Pat. No. 5,482,285 discloses a three-piece golf ball having an inner core and outer core encapsulated by an ionomer cover. The specific gravity of the outer core is reduced so that it falls within the range of 0.2 to 1.0. The specific gravity of the inner core is adjusted so that the total weight of the inner/outer core falls within a range of 32.0 to 39.0 g.

Nesbitt and Binette, U.S. Pat. No. 6,277,934 disclose a non-wound, multi-piece golf ball containing a spherical metal core component having a specific gravity of about 1.5 to about 19.4; and an outer core layer disposed about said spherical metal core component, wherein the core layer has a specific gravity of less than 1.2. The metal core is preferably contains a metal selected from steel, titanium, brass, lead, tungsten, molybdenum, copper, nickel, iron, and combinations thereof. Polybutadiene rubber compositions containing metallic powders can be used to form the core. The core assembly preferably has a coefficient of restitution of at least 0.730.

Sullivan, U.S. Pat. No. 6,494,795 discloses a golf ball comprising an inner core having a specific gravity of greater than 1.8 encased within a first mantle surrounding the inner core. A portion of the first mantle comprises a low specific gravity layer having a specific gravity of less than 0.9. The core may be made from a high density metal or from metal powder encased in a polymeric binder. High density metals such as steel, tungsten, lead, brass, bronze, copper, nickel, molybdenum, or alloys may be used. The mantle layer surrounding the inner core may be made from a thermoset or thermoplastic material such as epoxy, urethane, polyester, polyurethane, or polyurea.

Sullivan, U.S. Pat. No. 6,692,380 discloses a golf ball comprising an inner core having a specific gravity of at least 3, a diameter of about 0.40 to about 0.60 inches and preferably comprises a polymeric matrix of polyurethane, polyurea, or blends thereof. The outer core may be made from a polybutadiene rubber. The specific gravity of the compositions may be adjusted by adding fillers such as metal powder, metal alloy powder, metal oxide, metal stearates, particulates, and carbonaceous material.

Morgan and Jones, U.S. Pat. No. 6,986,717 discloses a golf ball containing a high-specific gravity central sphere encapsulated in a soft and resilient shell, preferably formed of a polybutadiene rubber. This shell is subsequently wound with thread that is preferably elastic to form a wound core. This wound core is then covered with a cover material such as balata, gutta percha, an ionomer or a blend of ionomers, polyurethane, polyurea-based composition, and epoxy-urethane-based compositions. The sphere is formed of metallic powder and a thermoset or thermoplastic binder material. Metals such as tungsten, steel, brass, titanium, lead, zinc, copper, bismuth, nickel, molybdenum, iron, bronze, cobalt, silver, platinum, and gold can be used. Preferably, the metal sphere has a specific gravity of at least 6.0 and a diameter of less than 0.5 inches.

Although some conventional multi-layered core constructions are generally effective in providing high resiliency golf balls, there is a continuing need for improved core constructions in golf balls. Particularly, it would be desirable to have multi-layered core constructions with selective specific gravities and mass densities to provide the ball with good flight distance along with spin control. The present invention provides core constructions and golf balls having such properties as well as other advantageous features, and benefits.

SUMMARY OF THE INVENTION

The present invention generally relates to multi-layered golf balls and more particularly to golf balls having a dual core, wherein at least one core layer is made of thermoplastic ethylene acid copolymer/plasticizer/metal compositions. In one version, the ball comprises a dual core having an inner core and surrounding outer core layer; and a cover having at least one layer disposed about the core structure. The inner core has an outer surface and geometric center, while the outer core layer has an outer surface and inner surface. In one preferred embodiment, the inner core comprises a thermoplastic ethylene acid copolymer/plasticizer/metal composition and the outer core layer comprises a thermoset rubber composition. Preferably, the thermoplastic composition comprises: i) an acid copolymer of ethylene and an α,β-unsaturated carboxylic acid, optionally including a softening monomer selected from the group consisting of alkyl acrylates and methacrylates; ii) a plasticizer; iii) a cation source present in an amount sufficient to neutralize from about 0% to about 100% of all acid groups present in the composition; and iv) metal material. The geometric center of the inner core and surface of the outer core layer each has hardness, and in one preferred version, the surface hardness of the outer core layer is greater than the center hardness of the inner core to provide a positive hardness gradient across the core assembly.

Various metals may be used in the compositions of this invention. In one particularly preferred version, the thermoplastic composition comprises a metal selected from the group consisting of copper, steel, brass, tungsten, titanium, aluminum, magnesium, molybdenum, cobalt, nickel, iron, tin, bronze, silver, gold, and platinum, and alloys and combinations thereof. Preferably, the thermoplastic composition comprises about 1 to about 60% by weight metal, more preferably about 5 to about 40% based on weight of composition.

Various plasticizers may be used in the compositions of this invention. In one particularly preferred version, the thermoplastic composition comprises a fatty acid ester, particularly an alkyl oleate, and more particularly ethyl oleate. Preferably, the thermoplastic composition comprises about 3 to about 50% by weight plasticizer, more preferably about 8 to about 42%, and even more preferably about 10 to about 30%, plasticizer based on weight of composition.

The ethylene acid copolymer/plasticizer/metal compositions of this invention may be used to form one or more core, intermediate, or cover layers. For instance, the compositions may be used in an innermost core or center layer, an intermediate core layer, or in an outermost core layer. The composition also may be used, for example, in an inner, intermediate or outermost cover layer. The compositions have a good combination of properties including Coefficient of Restitution (CoR) and compression so they can be used to make various golf ball layers.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having three-piece, four-piece, and five-piece constructions with single or multi-layered cover materials may be made. The term, "layer" as used herein means generally any spherical portion of the golf ball. More particularly, in one version, a three-piece golf ball having a dual-core and cover is made. The dual-core includes an inner core (center) and surrounding outer core layer. In another version, a four-piece golf ball comprising a dual-core and dual-cover (inner cover and outer cover layers) is made. In yet another construction, a four-piece or five-piece golf ball having a multi-layered core; an intermediate (casing) layer, and cover layer(s) may be made. As used herein, the term, "intermediate layer" means a layer of the ball disposed between the core and cover. The intermediate layer also may be referred to as a casing or mantle layer. The diameter and thickness of the different layers along with properties such as hardness and compression may vary depending upon the construction and desired playing performance properties of the golf ball.

Figure 1:
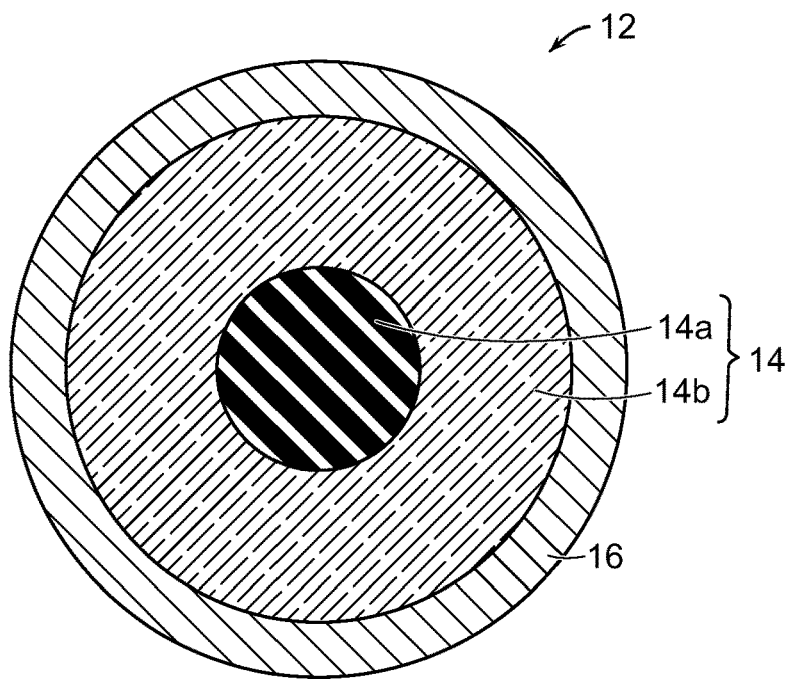
FIG. 1 is a cross-sectional view of a three-piece golf ball having a dual-layered core made in accordance with the present invention.
Figure 2:
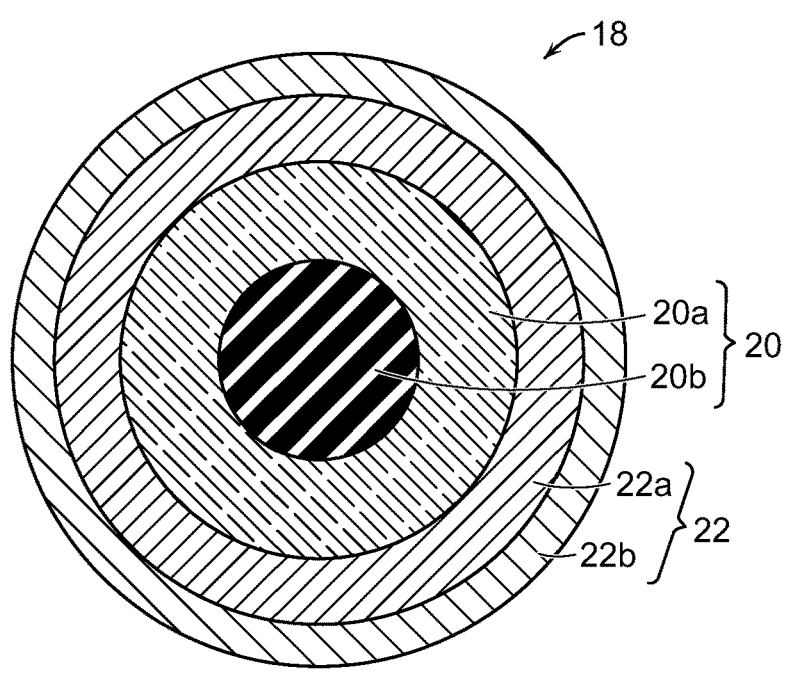
FIG. 2 is a cross-sectional view of a four-piece golf ball having a dual-layered core made in accordance with the present invention.
Figure 3:
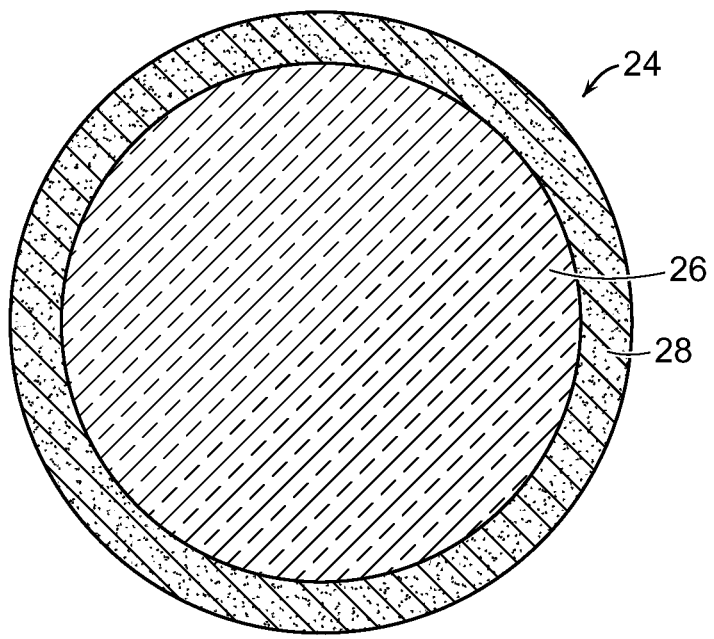
FIG. 3 is a cross-sectional view of a two-piece golf ball having a single-layered core and single-layered cover made in accordance with the present invention.

Referring to FIG. 1, one version of a golf ball that can be made in accordance with this invention is generally indicated at (12). The ball (12) contains a multi-layered core (14) having an inner core (center) (14a) and outer core layer (14b) surrounded by a single-layered cover (16). The inner core (14a) is relatively small in volume and generally has a diameter within a range of about 0.10 to about 1.10 inches. More particularly, the inner core (14a) preferably has a diameter size with a lower limit of about 0.15 or 0.25 or 0.35 or 0.45 or 0.55 inches and an upper limit of about 0.60 or 0.70 or 0.80 or 0.90 inches. In one preferred version, the diameter of the inner core (14a) is in the range of about 0.025 to about 0.080 inches, more preferably about 0.030 to about 0.075 inches. Meanwhile, the outer core layer (14b) generally has a thickness within a range of about 0.010 to about 0.250 inches and preferably has a lower limit of 0.010 or 0.020 or 0.025 or 0.030 inches and an upper limit of 0.070 or 0.080 or 0.100 or 0.200 inches. In one preferred version, the outer core layer has a thickness in the range of about 0.040 to about 0.170 inches, more preferably about 0.060 to about 0.150 inches. Referring to FIG. 2, in another version, the golf ball (18) contains a dual-core (20) having an inner core (center) (20a) and outer core layer (20b). The dual-core (20) is surrounded by a multi-layered cover (22) having an inner cover layer (22a) and outer cover layer (22b).

Golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. In general, the multi-layer core structure (14) has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core subassembly (14) is in the range of about 1.45 to about 1.62 inches.

As discussed further below, various compositions may be used to make the dual-core structures of the golf balls of this invention. The golf balls may contain certain fillers to adjust the specific gravity and weight of the core layers as needed. In general, the inner core (center) has a specific gravity within a range having a lower limit of about 1.18 or 1.50 or 2.00 or 2.50 g/cc and an upper limit of about 3.00 or 3.50 or 4.00 or 4.50 or 5.00 g/cc. In a preferred embodiment, the inner core has a specific gravity of about 1.20 to about 3.50 g/cc, more preferably about 1.25 to about 3.00 g/cc. Meanwhile, the outer core layer (14b) preferably has a relatively low specific gravity. The outer core layer (14b) generally has a specific gravity within a range having a lower limit of about 0.080 or 0.100 or 0.400 or 0.600 or 0.800 g/cc and an upper limit of about 1.00 or 1.10 or 1.20 g/cc. The amount of fillers used in the compositions is adjusted so the weight of the golf ball does not exceed limits set by USGA rules. The USGA has established a maximum weight of 45.93 g (1.62 ounces). For play outside of USGA rules, the golf balls can be heavier. In one preferred embodiment, the weight of the multi-layered core is in the range of about 28 to about 38 grams.

Inner Core Composition

Preferably, the inner core composition comprises a metal material such as, for example, copper, steel, brass, tungsten, titanium, aluminum, magnesium, molybdenum, cobalt, nickel, iron, lead, tin, bronze, silver, gold, and platinum, and alloys and combinations thereof. The metal material may be dispersed in a polymeric matrix comprising a thermoset rubber or thermoplastic material and plasticizer. The metal material is dispersed uniformly in the polymeric matrix to provide a substantially homogenous composition. The metal material is blended fully into the polymeric matrix to prevent agglomerates and aggregates from being formed. The resulting metal-containing composition is used to form an inner core structure having a relatively high specific gravity, thereby providing a ball having a lower moment of inertia as discussed further below.

In one version, a thermoplastic material is used as the polymeric binder (matrix) in the composition for making the inner core. Suitable thermoplastic materials that can be used to make the inner and outer core layers are described further below. These thermoplastic polymers include, for example, ethylene acid copolymers containing acid groups that are at least partially neutralized. Preferably, the neutralization level is greater than 70%, more preferably at least 90%, and even more preferably at least 100%. Such ethylene acid copolymers having a neutralization level of 70% or greater are commonly referred to as highly neutralized polymers (HNPs).

Suitable ethylene acid copolymers that may be used to form the thermoplastic compositions of this invention are generally referred to as copolymers of ethylene; $C_3$ to $C_8$ α, β-ethylenically unsaturated mono- or dicarboxylic acid; and optional softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. Other thermoplastics such as polyamides, polyamide-ethers, and polyamide-esters, polyurethanes, polyureas, polyurethane-polyurea hybrids, polyesters, polyolefins, polystyrenes, and blends thereof may be used.

In another version, a thermoset rubber material is used as the polymeric binder (matrix) in the composition for making the inner core. In the present invention, thermoset rubber materials also are preferably used for making the outer core layer. Suitable thermoset rubber materials that can be used to make the inner and outer core layers in accordance with this invention are described further below. Suitable thermoset rubber materials that may be used as the polymeric binder (matrix) material are natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof.

Preferably, the rubber composition comprises polybutadiene. In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyl-lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1, 4 cis-bond content of at least 40%, preferably greater than 80%, and more preferably greater than 90%. In general, polybutadiene rubbers having a high 1, 4 cis-bond content have high tensile strength. The polybutadiene rubber may have a relatively high or low Mooney viscosity.

Examples of commercially available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. of Seoul, South Korea; and DIENE 55NF, 70AC, and 320 AC, available from Firestone Polymers of Akron, Ohio.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbonene, polyoctenamer, polypentenamer, butyl rubber, EPR, EPDM, styrene-butadiene, and the like. In other versions, polybutadiene rubber is not used to form the polymeric matrix. Rather, a different thermoset rubber material is used. The curing mechanism for the thermoset rubber materials is described further below.

As discussed above, the thermoset or thermoplastic composition used to form the inner core contains a metal material. In one version, the metal material can constitute the entire inner core. That is, the metal material comprises 100% of the composition used to make the inner core. The metal material is preferably in the shape of a solid sphere, for example, a ball bearing. The metal sphere can be used as the inner core (center) and a polymeric outer core layer can be disposed about the metal center. Alternatively, metal fillers, as described further below, can be dispersed in the polymeric binder to form a metal-containing composition that can be used to make the inner core. Relatively heavy-weight metal materials such as, for example, a metal selected from the group consisting of copper, nickel, tungsten, brass, steel, magnesium, molybdenum, cobalt, lead, tin, silver, gold and platinum alloys can be used. Suitable steel materials include, for example, chrome steel, stainless steel, carbon steel, and alloys thereof. Alternatively, or in addition to the heavy metals, relatively light-weight metal materials such as titanium and aluminum alloys can be used, provided the inner core layer has the required specific gravity. The metal filler is added to the composition in a sufficient amount to obtain the desired specific gravity as discussed further below.

If the size of the inner core (center) is small and a dense metal material such as tungsten is being used, then the amount of tungsten needed to obtain the desired specific gravity will be relatively low. The weight of such a dense metal material is more concentrated so a smaller amount of material is needed. On the other hand, if a low density metal material such as aluminum is being used, then the amount of aluminum needed to reach the needed specific gravity will be relatively high. Normally, the metal filler is present in the composition in a concentration within the range of about 1% to about 60%. Preferably, the metal filler is present in the composition in an amount of 20 wt. % or less, 15 wt % or less, or 12 wt % or less, or 10 wt % or less, or 6 wt % or less, or 4 wt % or less based on weight of polymer in the composition.

The overall specific gravity of the core structure (inner core and outer core layers) is preferably at least 1.8 g/cc, more preferably at least 2.00 g/cc, and most preferably at least 2.50 g/cc. In general, the inner core has a specific gravity of at least about 1.00 g/cc and is generally within the range of about 1.00 to about 20.00. Preferably, the inner core has a lower limit of specific gravity of about 1.10 or 1.20 or 1.50 or 2.00 or 2.50 or 3.50 or 4.00 or 5.00 or 6.00 or 7.00 or 8.00 g/cc and an upper limit of about 9.00 or 9.50 or 10.00 or 10.50 or 11.00 or 12.00 or 13.00 or 14.00 or 15.00 or 16.00 or 17.00 or 18.00 or 19.00 or 19.50 g/cc. In a preferred embodiment, the inner core has a specific gravity of about 1.20 to about 5.50 g/cc, more preferably about 1.25 to about 3.25 g/cc.

Meanwhile, the outer core layer preferably has a relatively low specific gravity. Thus, the specific gravity of inner core layer ($SG_{inner}$) is preferably greater than the specific gravity of the outer core layer ($SG_{outer}$). For example, the outer core layer may have a specific gravity within a range having a lower limit of about 0.80, 0.90 g/cc, 1.00 or 1.25 or 2.00 or 2.50 or 3.00 or 3.50 or 4.00, 4.25 or 5.00 and an upper limit of about 6.00 or 6.50 or 7.00 or 7.25 or 8.00 or 8.50 or 9.00 or 9.25 or 10.00 g/cc. In one preferred embodiment, the $SG_{inner}$ is preferably in greater than the $SG_{outer}$ by at least 0.5 g/cc, more preferably 0.75 g/cc or greater, and even more preferably 1.00 g/cc or greater. In one embodiment, the difference between the $SG_{inner}$ and the $SG_{outer}$ is within the range of about 0.5 g/cc to about 2.0 g/cc.

Suitable metal fillers that can be added to the polymeric matrix used to form the inner core preferably have specific gravity values in the range from about 1.5 to about 19.5, and include, for example, metal (or metal alloy) powder, metal oxide, metal stearates, particulates, flakes, and the like, and blends thereof. Examples of useful metal (or metal alloy) powders include, but are not limited to, bismuth powder, boron powder, brass powder, bronze powder, cobalt powder, copper powder, iron powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include, but are not limited to, zinc oxide, iron oxide, aluminum oxide, titanium dioxide, magnesium oxide, zirconium oxide, and tungsten trioxide.

Plasticizers for Making the Thermoplastic Compositions

As discussed above, the thermoset and thermoplastic compositions of this invention used to make the inner core preferably contain a plasticizer. Plasticizers also can be added to the thermoplastic compositions used to make the outer core. Adding the plasticizers helps to reduce the glass transition temperature (Tg) of the composition. The glass transition in a polymer is a temperature range below which a polymer is relatively brittle and above which it is rubber-like. In addition to lowering the Tg, the plasticizer may also reduce the tan δ in the temperature range above the Tg. The Tg of a polymer is measured by a Differential Scanning calorimeter or a Dynamic Mechanical Analyzer (DMA) and the DMA is used to measure tan δ. The plasticizer may also reduce the hardness and compression of the composition when compared to its non-plasticized condition. The effects of adding a plasticizer to the thermoplastic copolymer composition on Tg, flex modulus, hardness, and other physical properties are discussed further below.

The thermoplastic compositions may contain one or more plasticizers. The plasticizers that may be used in the thermoplastic compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate.

In one preferred version, the plasticizer is selected from the group of polytetramethylene ether glycol (available from BASF under the tradename, PolyTHF™ 250); propylene carbonate (available from Huntsman Corp., under the tradename, Jeffsol™ PC); and/or dipropyleneglycol dibenzoate (available from Eastman Chemical under the tradename, Benzoflex™ 284). Mixtures of these plasticizers also may be used.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate are suitable. Iso- and terephthalates such as Dioctyl terephthalate and Dinonyl isophthalate may be used. Also appropriate are trimellitates such as Trimethyl trimellitate (TMTM), Tri-(2-ethylhexyl) trimellitate (TOTM), Tri-(n-octyl,n-decyl) trimellitate, Tri-(heptyl,nonyl) trimellitate, Tri-n-octyl trimellitate; as well as benzoates, including: 2-ethylhexyl-4-hydroxy benzoate, n-octyl benzoate, methyl benzoate, and ethyl benzoate.

Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS). Also, esters based on glycols, polyglycols and polyhydric alcohols such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate. In a particularly preferred version, the fatty acid ester, ethyl oleate is used as the plasticizer.

Glycerol-based esters such as soy-bean, tung, or linseed oils or their epoxidized derivatives can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Glycerol mono-, di-, and tri-oleates may be used per this invention, and in one preferred embodiment, glycerol trioleate is used as the plasticizer.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate (TCP), tributyl phosphate (TBP), alkyl sulfonic acid phenyl esters (ASE); and sulfonamides such as N-ethyl toluene sulfonamide, N-(2-hydroxypropyl) benzene sulfonamide, N-(n-butyl) benzene sulfonamide. Furthermore, thioester and thioether variants of the plasticizer compounds mentioned above are suitable.

Non-ester plasticizers such as alcohols, polyhydric alcohols, glycols, polyglycols, and polyethers also are suitable materials for plasticization. Materials such as polytetramethylene ether glycol, poly(ethylene glycol), and poly(propylene glycol), oleyl alcohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of plasticizers that may be used in the ethylene acid copolymer composition of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

Jacques et al., U.S. Pat. No. 7,045,185, the disclosure of which is hereby incorporated by reference, discloses sulphonamides such as N-butylbenzenesulphonamide, ethyltoluene-sulphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides also may be used in the present invention, and these materials are described in Fish, Jr. et al., U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl) benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., US Patent Application Publication 2010/0183837, the disclosure of which is hereby incorporated by reference.

As noted above, the fatty acid esters are particularly preferred plasticizers in the present invention. It has been found that the fatty acid esters perform well as plasticizers in ethylene acid copolymer compositions. The fatty acid esters have several advantageous properties. For example, the fatty acid esters are compatible with the ethylene acid copolymers and they tend to blend uniformly and completely with the acid copolymer. Also, the fatty acid esters tend to improve the resiliency and/or compression of the composition as discussed further below. The ethylene acid copolymer/plasticizer compositions may contain other ingredients that do not materially affect the basic and novel characteristics of the composition. For example, mineral fillers may be added as discussed above. In one particular version, the composition consists essentially of ethylene acid copolymer, metal, and plasticizer, particularly a fatty acid ester. In another particular version, the composition consists essentially of ethylene acid copolymer, cation source sufficient to neutralize at least 20% of the acid groups present in the composition, metal, and plasticizer, particularly a fatty acid ester.

One method of preparing the fatty acid ester involves reacting the fatty acid or mixture of fatty acids with a corresponding alcohol. The alcohol can be any alcohol including, but not limited to, linear, branched, and cyclic alcohols. The fatty acid ester is commonly a methyl, ethyl, n-propyl, or butyl ester of a carboxylic acid that contains from 4 to 30 carbon atoms. In the present invention, ethyl esters and particularly ethyl oleate are preferred fatty acid esters because of their properties. The carboxylic acid may be saturated or unsaturated. Examples of suitable saturated carboxylic acids, that is, carboxylic acids in which the carbon atoms of the alkyl chain are connected by single bonds, include but are not limited to butyric acid (chain length of $C_4$ and molecular weight of 88.1); capric acid ($C_{10}$ and MW of 172.3); lauric acid ($C_{12}$ and MW of 200.3); myristic acid ($C_{14}$ and MW of 228.4); palmitic acid ($C_{16}$ and MW of 256.4); stearic acid ($C_{18}$ and MW of 284.5); and behenic acid ($C_{22}$ and MW of 340.6). Examples of suitable unsaturated carboxylic acids, that is, a carboxylic acid in which there is one or more double bonds between the carbon atoms in the alkyl chain, include but are not limited to oleic acid (chain length and unsaturation C18:1; and MW of 282.5); linoleic acid (C18:2 and MW of 280.5; linolenic acid (C18:3 and MW of 278.4); and erucic acid (C22:1 and MW of 338.6).

It is believed that the plasticizer should be added in a sufficient amount to the ethylene acid copolymer composition so there is a substantial change in the stiffness and/or hardness of the ethylene acid copolymer. Thus, although the concentration of plasticizer may be as little as 1% by weight to form some ethylene acid copolymer compositions per this invention, it is preferred that the concentration be relatively greater. For example, it is preferred that the concentration of the plasticizer be at least 3 weight percent (wt. %). More particularly, it is preferred that the plasticizer be present in an amount within a range having a lower limit of 1% or 3% or 5% or 7% or 8% or 10% or 12% or 15% or 18% and an upper limit of 20% or 22% or 25% or 30% or 35% or 40% or 42% or 50% or 55% or 60% or 66% or 71% or 75% or 80%. In one preferred embodiment, the concentration of plasticizer falls within the range of about 7% to about 75%, preferably about 9% to about 55%, and more preferably about 15% to about 50%.

It is believed that adding the plasticizer to the ethylene acid copolymer helps make the composition softer and more rubbery. Adding the plasticizers to the composition helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures.

Thus, in one embodiment, the first ethylene acid copolymer (containing ethylene acid copolymer only) composition has a first flex modulus value and the second ethylene acid copolymer (containing ethylene acid copolymer and plasticizer) composition has a second flex modulus value, wherein the second flex modulus value is at least 1% less; or at least 2% less; or at least 4% less; or at least 8% less; or at least 10% less than the first modulus value.

Plasticized thermoplastic compositions of the present invention are not limited by any particular method or any particular equipment for making the compositions. In a preferred embodiment, the composition is prepared by the following process. The acid copolymer(s), plasticizer, optional melt-flow modifier(s), and optional additive(s)/filler(s) are simultaneously or individually fed into a melt extruder, such as a single or twin screw extruder. If the acid polymer is to be neutralized, a suitable amount of cation source is then added to achieve the desired level of neutralization neutralized. The acid polymer may be partially or fully neutralized prior to the above process. The components are intensively mixed prior to being extruded as a strand from the die-head. Additional methods for incorporating plasticizer into the thermoplastic compositions herein are disclosed in co-pending U.S. patent application Ser. No. 13/929,841, as well as in U.S. Pat. Nos. 8,523,708 and 8,523,709, which are fully incorporated by reference herein.

More particularly, in one embodiment, the ethylene acid copolymer/plasticizer composition has a flex modulus lower limit of about 500 (or less), 1,000, 1,600, 2,000, 4,200, 7,500, 9,000, 10,000 or 20,000 or 40,000 or 50,000 or 60,000 or 70,000 or 80,000 or 90,000 or 100,000; and a flex modulus upper limit of about 110,000 or 120,000 or 130,000 psi or 140,000 or 160,000 or 180,000 or 200,000 or 300,000 or greater. In general, the properties of flex modulus and hardness are related, whereby flex modulus measures the material's resistance to bending, and hardness measures the material's resistance to indentation. In general, as the flex modulus of the material increases, the hardness of the material also increases. As discussed above, adding the plasticizer to the ethylene acid copolymer helps reduce the flex modulus of the composition and it also helps reduce hardness to a certain degree. Thus, in one embodiment, the ethylene acid copolymer/plasticizer composition is relatively soft and having a hardness of no greater than 40 Shore D or no greater than 55 Shore C. For example, the Shore D hardness may be within a range having a lower limit of 5 or 8 or 10 or 12 or 14 and an upper limit of 28 or 30 or 32 or 34 or 35 or 38 or 40 Shore D. The Shore C hardness may be within the range having a lower limit of 10 or 13 or 15 or 17 or 19 and an upper limit of 44 or 46 or 48 or 50 or 53 or 55 Shore C. In other embodiments, the ethylene acid copolymer/plasticizer composition is moderately soft having a hardness of no greater than about 60 Shore D or no greater than 75 Shore C. For example, the Shore D hardness may be within a range having a lower limit of 25, 28, 20, 32, 35, 36, 38, or 40, and an upper limit of 42, 45, 48, 50, 54, 56, or 60. The Shore C hardness may be within the range of having a lower limit of 30, 33, 35, 37, 39, 41, or 43, and an upper limit of 62, 64, 66, 68, 71, 73 or 75 Shore C. In yet other embodiments, the ethylene acid copolymer/plasticizer composition is moderately hard having a hardness no greater than 95 Shore D or no greater than 99C. For example, the Shore D hardness may be within the range having a lower limit of about 42, 44, 47, 51, 53, or 58 and an upper limit of about 60, 65, 72, 77, 80, 84, 91, or 95 Shore D. The Shore C hardness may be within the range having a lower limit of 57, 59, 62, 66, or 72 and an upper limit of about 75, 78, 84, 87, 90, 93, 95, 97, or 99 Shore C.

It also is believed that adding the plasticizer to the ethylene acid copolymer composition helps reduce the glass transition temperature (Tg) of the composition in many instances. Thus, in one embodiment, the first ethylene acid copolymer (containing ethylene acid copolymer only) composition has a first Tg value and the second ethylene acid copolymer (containing ethylene acid copolymer and plasticizer) composition has a second Tg value, wherein the second Tg value is at least 1 degree (1°) less; or at least 2° less; or at least 4° less; or at least 8°; or at least 10° less than the first Tg value. In other embodiments, the first Tg value and the second Tg value are approximately the same.

In addition, introducing the specific plasticizers of this invention into the ethylene acid copolymer composition generally helps to reduce the compression and/or increase the COR of the composition (when molded into a solid sphere and tested) versus a non-plasticized composition (when molded into a solid sphere and tested.) Plasticized ethylene acid copolymer compositions typically show compression values lower, or at most equal to, non-plasticized compositions while the plasticized compositions display COR values that may be higher, or at the least equal to, non-plasticized compositions. This effect is surprising, because in many conventional compositions, the compression of the composition increases as the COR increases. In some instances, plasticization of the composition might produce a slight reduction in the COR while at the same time reducing the compression to a greater extent, thereby providing an overall improvement to the compression/COR relationship over the non-plasticized composition.

Outer Core Composition

As discussed above, the inner core (center) may be formed from metal-containing, plasticized thermoset or thermoplastic compositions and is formed preferably from a metal-filled thermoplastic composition comprising a plasticizer. Likewise, the outer core layer may be formed from thermoset or thermoplastic materials. A plasticizer, as described above, optionally may be added to the thermoset or thermoplastic composition used to form the outer core layer. In one particularly preferred embodiment, the outer core layer is formed from a thermoset rubber composition. Thus, in one preferred version, the inner core is formed from a metal-containing, plasticized thermoplastic composition and the outer core is formed from a thermoset composition. In another version, the inner core is formed from a metal-containing, plasticized thermoset composition, and the outer core is formed from a thermoset composition. More particularly, the inner core is formed from a first metal-containing, plasticized thermoset composition and the outer core layer is formed from a second thermoset composition. The same or different ingredients may be used to form the first and second thermoset compositions, respectively. For example, the second thermoset composition used to form the outer core also may include a plasticizer. However, the second thermoplastic composition preferably has different hardness and flex modulus values than the first thermoplastic composition. Suitable thermoplastic materials that can be used to make the inner and outer core layers are described further below.

Preferably, an ionomer composition comprising an ethylene acid copolymer containing acid groups that are at least partially neutralized is used to form the thermoplastic composition. As discussed above, the thermoplastic composition can be used to form the inner or outer core layer. In one embodiment, the neutralization level of the ethylene acid copolymer is greater than 70%. For example, the neutralization level may be at least 90%, and even at least 100% in some instances. Alternatively, the neutralization level may be less than 70%. Preferably, a highly neutralized polymer (HNP) is used to form the thermoplastic composition as discussed further below.

Suitable ethylene acid copolymers that may be used to form the respective compositions of this invention are generally referred to as copolymers of ethylene; $C_3$ to $C_8$ α, β-ethylenically unsaturated mono- or dicarboxylic acid; and optional softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

When a softening monomer is included, such copolymers are referred to herein as E/X/Y-type copolymers, wherein E is ethylene; X is a $C_3$ to $C_8$ α, β-ethylenically unsaturated mono- or dicarboxylic acid; and Y is a softening monomer. The softening monomer is typically an alkyl (meth) acrylate, wherein the alkyl groups have from 1 to 8 carbon atoms. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The acidic groups in the copolymeric ionomers are partially or totally neutralized with a cation source. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. Preferred metal cation salts are calcium and magnesium-based salts. High surface area cation particles such as micro and nano-scale cation particles are preferred. The amount of cation used in the composition is readily determined based on desired level of neutralization.

For example, ionomeric resins having acid groups that are neutralized from about 10 percent to about 100 percent may be used. In one ionomer composition, the acid groups are partially neutralized. That is, the neutralization level is from about 10% to about 70%, more preferably 20% to 60%, and most preferably 30 to 50%. These ionomer compositions, containing acid groups neutralized to 70% or less, may be referred to ionomers having relatively low neutralization levels.

On the other hand, the ionomer composition may contain acid groups that are highly or fully-neutralized. These highly neutralized polymers (HNPs) are preferred for forming at least one core layer in the present invention and are discussed in further detail below. In these HNPs, the neutralization level is greater than 70%, preferably at least 90% and even more preferably at least 100%. In another embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In one preferred embodiment, a high acid ethylene acid copolymer containing about 19 to 20 wt. % methacrylic or acrylic acid is neutralized with zinc and sodium cations to a 95% neutralization level.

Highly Neutralized Polymer (HNP) Compositions

Suitable highly-neutralized polymer (HNP) compositions, which will be plasticized per this invention, comprise an HNP and optionally melt-flow modifier(s), additive(s), and/or filler(s). When used to form the inner core, the HNP composition also contains metal materials as discussed above. For purposes of the present disclosure, "HNP" refers to an acid polymer after at least 70%, preferably at least 80%, more preferably at least 90%, more preferably at least 95%, and even more preferably 100%, of the acid groups present are neutralized. It is understood that the HNP may be a blend of two or more HNPs. Preferred acid polymers are copolymers of an α-olefin and a $C_3$-$C_8$α,β-ethylenically unsaturated carboxylic acid, optionally including a softening monomer. The α-olefin is preferably selected from ethylene and propylene. The acid is preferably selected from (meth) acrylic acid, ethacrylic acid, maleic acid, crotonic acid, fumaric acid, and itaconic acid. (Meth) acrylic acid is particularly preferred. The optional softening monomer is preferably selected from alkyl (meth) acrylate, wherein the alkyl groups have from 1 to 8 carbon atoms. Preferred acid polymers include, but are not limited to, those wherein the α-olefin is ethylene, the acid is (meth) acrylic acid, and the optional softening monomer is selected from (meth) acrylate, n-butyl (meth) acrylate, isobutyl (meth) acrylate, methyl (meth) acrylate, and ethyl (meth) acrylate. Particularly preferred acid polymers include, but are not limited to, ethylene/(meth) acrylic acid/n-butyl acrylate, ethylene/(meth) acrylic acid/methyl acrylate, and ethylene/(meth) acrylic acid/ethyl acrylate.

Suitable acid polymers for forming the HNP also include acid polymers that are already partially neutralized. Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from ExxonMobil Chemical Company. Also suitable are DuPont® HPF 1000 and DuPont® HPF 2000, ionomeric materials commercially available from E. I. du Pont de Nemours and Company. In some embodiments, very low modulus ionomer-("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

The α-olefin is typically present in the acid polymer in an amount of 15 wt % or greater, or 25 wt % or greater, or 40 wt % or greater, or 60 wt % or greater, based on the total weight of the acid polymer. The acid is typically present in the acid polymer in an amount within a range having a lower limit of 1 or 2 or 4 or 6 or 8 or 10 or 12 or 15 or 16 or 20 wt % and an upper limit of 20 or 25 or 26 or 30 or 35 or 40 wt %, based on the total weight of the acid polymer. The optional softening monomer is typically present in the acid polymer in an amount within a range having a lower limit of 0 or 1 or 3 or 5 or 11 or 15 or 20 wt % and an upper limit of 23 or 25 or 30 or 35 or 50 wt %, based on the total weight of the acid polymer.

Additional suitable acid polymers are more fully described, for example, in U.S. Pat. Nos. 5,691,418, 6,562,906, 6,653,382, 6,777,472, 6,762,246, 6,815,480, and 6,953,820 and U.S. Patent Application Publication Nos. 2005/0148725, 2005/0049367, 2005/0020741, 2004/0220343, and 2003/0130434, the entire disclosures of which are hereby incorporated herein by reference.

The HNP is formed by reacting the acid polymer with a sufficient amount of cation source, optionally in the presence of a high molecular weight organic acid or salt thereof, such that at least 70%, preferably at least 80%, more preferably at least 90%, more preferably at least 95%, and even more preferably 100%, of all acid groups present are neutralized. The resulting HNP composition is plasticized with a plasticizer. Suitable plasticizers are described further below. In a particular embodiment, the cation source is present in an amount sufficient to neutralize, theoretically, greater than 100%, or 105% or greater, or 110% or greater, or 115% or greater, or 120% or greater, or 125% or greater, or 200% or greater, or 250% or greater of all acid groups present in the composition. The acid polymer can be reacted with the optional high molecular weight organic acid or salt thereof and the cation source simultaneously, or the acid polymer can be reacted with the optional high molecular weight organic acid or salt thereof prior to the addition of the cation source.

Suitable cation sources include metal ions and compounds of alkali metals, alkaline earth metals, and transition metals; metal ions and compounds of rare earth elements; and combinations thereof. Preferred cation sources are metal ions and compounds of magnesium, sodium, potassium, cesium, calcium, barium, manganese, copper, zinc, tin, lithium, and rare earth metals. The acid polymer may be at least partially neutralized prior to contacting the acid polymer with the cation source to form the HNP. Methods of preparing ionomers, and the acid polymers on which ionomers are based, are disclosed, for example, in U.S. Pat. Nos. 3,264,272, and 4,351,931, and U.S. Patent Application Publication No. 2002/0013413.

Suitable high molecular weight organic acids, for both the metal salt and as a component of the ester plasticizer, are aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenic acid, dimerized derivatives thereof, and combinations thereof. Salts of high molecular weight organic acids comprise the salts, particularly the barium, lithium, sodium, zinc, bismuth, chromium, cobalt, copper, potassium, strontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. Suitable organic acids and salts thereof are more fully described, for example, in U.S. Pat. No. 6,756,436, the entire disclosure of which is hereby incorporated herein by reference. In a particular embodiment, the HNP composition comprises an organic acid salt in an amount of 20 phr or greater, or 25 phr or greater, or 30 phr or greater, or 35 phr or greater, or 40 phr or greater.

The plasticized HNP compositions of the present invention optionally contain one or more melt-flow modifiers. The amount of melt-flow modifier in the composition is readily determined such that the melt-flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

It is not required that a conventional melt-flow modifier be added to the plasticized HNP composition of this invention. Such melt-flow modifiers are optional. If a melt-flow modifier is added, it may be selected from the group of traditional melt-flow modifiers including, but not limited to, the high molecular weight organic acids and salts thereof disclosed above, polyamides, polyesters, polyacrylates, polyurethanes, polyethers, polyureas, polyhydric alcohols, and combinations thereof. Also suitable are the non-fatty acid melt-flow modifiers disclosed in U.S. Pat. Nos. 7,365,128 and 7,402,629, the entire disclosures of which are hereby incorporated herein by reference. However, as discussed above, certain plasticizers are added to the composition of this invention, and it is recognized that such plasticizers may modify the melt-flow of the composition in some instances.

The plasticized HNP compositions of the present invention optionally include additive(s) and/or filler(s) in an amount within a range having a lower limit of 0 or 5 or 10 wt %, and an upper limit of 15 or 20 or 25 or 30 or 50 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully disclosed, for example, in U.S. Patent Application Publication No. 2003/0225197, the entire disclosure of which is hereby incorporated herein by reference.

In some embodiments, the plasticized HNP composition is a "moisture resistant" HNP composition, i.e., having a moisture vapor transmission rate ("MVTR") of 8 g-mil/100 in$^2$/day or less (i.e., 3.2 g-mm/m$^2$·day or less), or 5 g-mil/100 in$^2$/day or less (i.e., 2.0 g-mm/m$^2$·day or less), or 3 g-mil/100 in$^2$/day or less (i.e., 1.2 g-mm/m$^2$·day or less), or 2 g-mil/100 in$^2$/day or less (i.e., 0.8 g-mm/m$^2$·day or less), or 1 g-mil/100 in$^2$/day or less (i.e., 0.4 g-mm/m$^2$·day or less), or less than 1 g-mil/100 in$^2$/day (i.e., less than 0.4 g-mm/m$^2$·day). Suitable moisture resistant HNP compositions are disclosed, for example, in U.S. Patent Application Publication Nos. 2005/0267240, 2006/0106175, and 2006/0293464, the entire disclosures of which are hereby incorporated herein by reference.

The plasticized HNP compositions of the present invention are not limited by any particular method or any particular equipment for making the compositions. In a preferred embodiment, the composition is prepared by the following process. The acid polymer(s), plasticizers, optional melt-flow modifier(s), and optional additive(s)/filler(s) are simultaneously or individually fed into a melt extruder, such as a single or twin screw extruder. Other suitable methods for incorporating the plasticizer into the composition are described further below. A suitable amount of cation source is then added such that at least 70%, or at least 80%, or at least 90%, or at least 95%, or at least 100%, of all acid groups present are neutralized. Optionally, the cation source is added in an amount sufficient to neutralize, theoretically, 105% or greater, or 110% or greater, or 115% or greater, or 120% or greater, or 125% or greater, or 200% or greater, or 250% or greater of all acid groups present in the composition. The acid polymer may be at least partially neutralized prior to the above process. The components are intensively mixed prior to being extruded as a strand from the die-head.

The HNP composition, which will be plasticized with specific plasticizers as described in detail below, optionally comprises at least one additional polymer component selected from partially neutralized ionomers as disclosed, for example, in U.S. Patent Application Publication No. 2006/0128904, the entire disclosure of which is hereby incorporated herein by reference; bimodal ionomers, such as those disclosed in U.S. Patent Application Publication No. 2004/0220343 and U.S. Pat. Nos. 6,562,906, 6,762,246, 7,273,903, 8,193,283, 8,410,219, and 8,410,220, the entire disclosures of which are hereby incorporated herein by reference, and particularly Surlyn® AD 1043, 1092, and 1022 ionomer resins, commercially available from E. I. du Pont de Nemours and Company; ionomers modified with rosins, such as those disclosed in U.S. Patent Application Publication No. 2005/0020741, the entire disclosure of which is hereby incorporated by reference; soft and resilient ethylene copolymers, such as those disclosed U.S. Patent Application Publication No. 2003/0114565, the entire disclosure of which is hereby incorporated herein by reference; polyolefins, such as linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins; polyamides; polyesters; polyethers; polycarbonates; polysulfones; polyacetals; polylactones; acrylonitrile-butadiene-styrene resins; polyphenylene oxide; polyphenylene sulfide; styrene-acrylonitrile resins; styrene maleic anhydride; polyimides; aromatic polyketones; ionomers and ionomeric precursors, acid copolymers, and conventional HNPs, such as those disclosed in U.S. Pat. Nos. 6,756,436, 6,894,098, and 6,953,820, the entire disclosures of which are hereby incorporated herein by reference; polyurethanes; grafted and non-grafted metallocene-catalyzed polymers, such as single-site catalyst polymerized polymers, high crystalline acid polymers, cationic ionomers, and combinations thereof.

Other polymer components that may be included in the plasticized HNP composition include, for example, natural and synthetic rubbers, including, but not limited to, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber (such as ethylene-alkyl acrylates and ethylene-alkyl methacrylates, and, more specifically, ethylene-ethyl acrylate, ethylene-methyl acrylate, and ethylene-butyl acrylate), chlorinated isoprene rubber, acrylonitrile chlorinated isoprene rubber, and polybutadiene rubber (cis and trans). Additional suitable blend polymers include those described in U.S. Pat. No. 5,981,658, for example at column 14, lines 30 to 56, the entire disclosure of which is hereby incorporated herein by reference.

The blend may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder. In a particular embodiment, the plasticized HNP composition comprises an acid copolymer and an additional polymer component, wherein the additional polymer component is a non-acid polymer present in an amount of greater than 50 wt %, or an amount within a range having a lower limit of 50 or 55 or 60 or 65 or 70 and an upper limit of 80 or 85 or 90, based on the combined weight of the acid copolymer and the non-acid polymer. In another particular embodiment, the plasticized HNP composition comprises an acid copolymer and an additional polymer component, wherein the additional polymer component is a non-acid polymer present in an amount of less than 50 wt %, or an amount within a range having a lower limit of 10 or 15 or 20 or 25 or 30 and an upper limit of 40 or 45 or 50, based on the combined weight of the acid copolymer and the non-acid polymer.

The plasticized HNP compositions of the present invention, in the neat (i.e., unfilled) form, preferably have a specific gravity of from 0.95 g/cc to 0.99 g/cc. Any suitable filler, flake, fiber, particle, or the like, of an organic or inorganic material may be added to the HNP composition to increase or decrease the specific gravity, particularly to adjust the weight distribution within the golf ball, as further disclosed in U.S. Pat. Nos. 6,494,795, 6,547,677, 6,743,123, 7,074,137, and 6,688,991, the entire disclosures of which are hereby incorporated herein by reference.

Other suitable thermoplastic polymers that may be used to form the inner and outer core layers include, but are not limited to, the following polymers (including homopolymers, copolymers, and derivatives thereof):

(a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

These thermoplastic polymers may be used by and in themselves to form the inner and outer core layers, or blends of thermoplastic polymers including the above-described polymers and ethylene acid copolymer ionomers may be used. It also is recognized that the ionomer compositions may contain a blend of two or more ionomers. For example, the composition may contain a 50/50 wt. % blend of two different highly-neutralized ethylene/methacrylic acid copolymers. In another version, the composition may contain a blend of one or more ionomers and a maleic anhydride-grafted non-ionomeric polymer. The non-ionomeric polymer may be a metallocene-catalyzed polymer. In another version, the composition contains a blend of a highly-neutralized ethylene/methacrylic acid copolymer and a maleic anhydride-grafted metallocene-catalyzed polyethylene. In yet another version, the composition contains a material selected from the group consisting of highly-neutralized ionomers optionally blended with a maleic anhydride-grafted non-ionomeric polymer; polyester elastomers; polyamide elastomers; and combinations of two or more thereof.

More particularly, in one version, the same thermoplastic composition used to form the inner core also may be used to form the outer core layer. Alternatively, in other versions, different thermoplastic compositions are used to form the inner and outer core layers. For example, in one embodiment, the inner and outer core layers have the same specific gravity levels. In a second embodiment, the specific gravity of the inner core is greater than the specific gravity of the outer core layer. Finally, in a third embodiment, the specific gravity of the inner core is less than the specific gravity of the outer core layer. Thus, both the inner and outer core layers may be formed from an ethylene acid copolymer ionomer composition, for example.

The respective thermoplastic and thermoset compositions may contain metals as described above. Conventional additives, for example, those additives described below as being suitable for rubber formulations, also may be included in the thermoplastic composition. The amount and type of specific gravity fillers used in each layer, if any, may be adjusted to achieve a desired specific gravity. For example, if the objective is to make the specific gravities of the inner and outer core layers different, in one example, the inner core layer may contain a relatively small concentration of metal fillers, while the outer core layer may contain a large concentration of metal fillers. In another embodiment, the inner core and/or outer core layer may not contain any metal materials. In yet another example, the outer core layer may contain a small concentration of metal fillers, while the inner core layer contains a large concentration of metal materials. On the other hand, if the objective is to make the specific gravities of the inner and outer core layers substantially the same, then the inner and outer core layers may contain the same concentration of metal fillers in the same polymeric matrix.

As discussed above, the specific gravity of inner core layer ($SG_{inner}$) is preferably greater than the specific gravity of the outer core layer ($SG_{outer}$). In general, the specific gravities of the respective pieces of an object affect the Moment of Inertia (MOI) of the object. In general, the Moment of Inertia of a ball (or other object) about a given axis refers to how difficult it is to change the ball's angular motion about that axis. If the ball's mass is concentrated towards the center (the center piece has a higher specific gravity than the outer piece), less force is required to change its rotational rate, and the ball has a relatively low Moment of Inertia. In such balls, most of the mass is located close to the ball's axis of rotation and less force is needed to generate spin. Thus, the ball has a generally high spin rate. Conversely, if the ball's mass is concentrated towards the outer surface (the outer piece has a higher specific gravity than the center piece), more force is required to change its rotational rate, and the ball has a relatively high Moment of Inertia. That is, in such balls, most of the mass is located away from the ball's axis of rotation and more force is needed to generate spin. Such balls have a generally low spin rate.

The golf balls of this invention having the above-described core constructions show both good resiliency and spin control. The resulting ball has a relatively high Coefficient of Restitution (COR) allowing it to reach a high velocity when struck by a golf club. Thus, the ball tends to travel a long distance and this is particularly important for driver shots off the tee. At the same time, the ball has a soft touch and feel. Thus, the golfer has better control over the ball which is particularly important when making approach shots using irons near the green. The golfer can hit the ball with a soft touch so that it drops and stops quickly on the green. Furthermore, professional and highly skilled recreational golfers can place a back-spin on the ball for even better accuracy and shot-control. For such golfers, the right amount of spin and touch can be placed on the ball easily. The ball is more playable and the golfer has more comfort playing with such a ball. The golfer can hit the ball so that it flies the correct distance while maintaining control over flight trajectory, spin, and placement.

More particularly, as described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). The term, "specific gravity" as used herein, has its ordinary and customary meaning, that is, the ratio of the density of a substance to the density of water at 4° C., and the density of water at this temperature is 1 g/cm³. The specific gravity may be measured according to ASTM test specification ASTM D-792-98. In addition, the cores of this invention typically have a COR of about 0.75 or greater; and preferably about 0.80 or greater. The compression of the overall core (that is, center and one or more outer core layers) preferably is about 20 to about 110 and more preferably in the range of about 30 to about 90. The center (innermost core layer) can have significantly lower compression and may be less than 10 and preferably less than 20 and more preferably less than 30.

Curing of Rubber Composition

The rubber compositions of this invention may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethyl-cyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy) hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

As discussed above, the compositions of this invention are formulated to have specific gravity levels so that they can be used to form certain core components of the golf ball. In addition to the metal fillers discussed above, the rubber compositions may contain other additives. Examples of useful fillers include but are not limited to, carbonaceous materials such as graphite and carbon black. graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, rubber regrind (which is recycled uncured rubber material which is mixed and ground), cotton flock, natural bitumen, cellulose flock, and leather fiber. Micro balloon fillers such as glass and ceramic, and fly ash fillers can also be used.

In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof.

In addition, the rubber compositions may include antioxidants to prevent the breakdown of the elastomers. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.)

Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, anti-oxidants, antiozonants, as well as other additives known in the art may be added to the rubber composition.

Core Structure

The hardness of the core sub-assembly (inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core sub-assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient.

For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient.

On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient.

In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 or 22 or 26 or 30 or 34 or 36 or 38 or 42 or 48 or 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 70 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) or midpoint hardness of the outer core layer ($H_{midpoint\ of\ OC}$), preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness ($H_{inner\ surface\ of\ OC}$) or midpoint hardness ($H_{midpoint\ of\ OC}$) of the outer core layer, as measured in Shore C units, preferably has a lower limit of about 40 or 42 or 44 or 45 or 47 or 50 or 52 or 54 or 55 or 58 or 60 or 63 or 65 or 67 or 70 or 73 or 75 Shore C, and an upper limit of about 78 or 80 or 85 or 88 or 89 or 90 or 92 or 95 Shore C.

The midpoint of a core layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

In one embodiment, the outer surface hardness of the outer core layer ($H_{outer\ surface\ of\ OC}$), is less than the outer surface hardness ($H_{inner\ core\ surface}$) or midpoint hardness ($H_{midpoint\ of\ OC}$), of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) or midpoint hardness ($H_{midpoint\ of\ OC}$), of the inner core by at least 3 Shore C units and more preferably by at least 5 Shore C.

As discussed above, the inner core is preferably formed from a thermoplastic composition and more preferably an ethylene acid copolymer/plasticizer composition. And, the outer core layer is formed preferably from a thermoset composition such as polybutadiene rubber. In other embodiments, the outer core layer also may be formed from thermoplastic compositions, particularly ethylene acid copolymer/plasticizer compositions.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. The gradient across the core assembly will vary based on several factors including, but not limited to, the dimensions of the inner core, intermediate core, and outer core layers.

The inner core preferably has a diameter in the range of about 0.100 to about 1.100 inches. For example, the inner core may have a diameter within a range of about 0.100 to about 0.500 inches. In another example, the inner core may have a diameter within a range of about 0.300 to about 0.800 inches. More particularly, the inner core may have a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. As far as the outer core layer is concerned, it preferably has a thickness in the range of about 0.100 to about 0.750 inches. For example, the lower limit of thickness may be about 0.050 or 0.100 or 0.150 or 0.200 or 0.250 or 0.300 or 0.340 or 0.400 and the upper limit may be about 0.500 or 0.550 or 0.600 or 0.650 or 0.700 or 0.750 inches.

The USGA has established a maximum weight of 45.93 g (1.62 ounces) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. As discussed further below, the golf ball contains a cover which may be multi-layered and in addition may contain intermediate layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core sub-assembly is in the range of about 1.45 to about 1.62 inches.

Cover Structure

The golf ball cores of this invention may be enclosed with one or more cover layers. For example, golf ball having inner and outer cover layers may be made. In addition, as discussed above, an intermediate layer may be disposed between the core and cover layers. The cover layers preferably have good impact durability and wear-resistance. The ethylene acid copolymer/plasticizer compositions of this invention may be used to form at least one of the intermediate and/or cover layers.

In one particularly preferred version, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The compositions used to make any cover layer (for example, inner, intermediate, or outer cover layer) may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

A single cover or, preferably, an inner cover layer is formed around the outer core layer. When an inner cover layer is present, an outer cover layer is formed over the inner cover layer. Most preferably, the inner cover is formed from an ionomeric material and the outer cover layer is formed from a polyurethane material, and the outer cover layer has a hardness that is less than that of the inner cover layer. Preferably, the inner cover has a hardness of greater than about 60 Shore D and the outer cover layer has a hardness of less than about 60 Shore D. In an alternative embodiment, the inner cover layer is comprised of a partially or fully neutralized ionomer, a thermoplastic polyester elastomer such as Hytrel™, commercially available form DuPont, a thermoplastic polyether block amide, such as Pebax™, commercially available from Arkema, Inc., or a thermoplastic or thermosetting polyurethane or polyurea, and the outer cover layer is comprised of an ionomeric material. In this alternative embodiment, the inner cover layer has a hardness of less than about 60 Shore D and the outer cover layer has a hardness of greater than about 55 Shore D and the inner cover layer hardness is less than the outer cover layer hardness.

As discussed above, the core structure of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Manufacturing of Golf Balls

The inner core may be formed by any suitable technique including compression and injection molding methods. The outer core layer, which surrounds the inner core, is formed by molding compositions over the inner core. Compression or injection molding techniques may be used to form the other layers of the core sub-assembly. Then, the cover layers are applied over the core sub-assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball sub-assembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Different ball constructions can be made using the core construction of this invention as shown in FIGS. 1-4. Such golf ball constructions include, for example, one-piece, two-piece, three-piece, four-piece, and five-piece constructions. It should be understood that the golf balls shown in FIGS. 1-4 are for illustrative purposes only, and they are not meant to be restrictive. Other golf ball constructions can be made in accordance with this invention.

Three-Layered Cores

For example, in another embodiment, a core structure having three layers is formed. One or more of the core layers is formed from a highly neutralized polymer ("HNP") composition; one or more of the core layers is formed from a thermoset rubber composition; and one or more of the core layers is formed from the plasticized thermoplastic composition containing metal of this invention. In a particular embodiment, the core comprises: a) an inner core formed from the plasticized thermoplastic composition containing metal of this invention, b) a thermoplastic HNP intermediate layer, and c) a thermoset rubber outer core layer. In another particular embodiment, the core includes an inner layer formed from a HNP composition, b) an intermediate layer formed from a plasticized thermoplastic composition containing metal of this invention, and c) a thermoset rubber outer core layer. In yet another particular embodiment, the core comprises: a) an inner core layer formed from a HNP composition, b) a thermoset rubber intermediate core layer, and c) plasticized thermoplastic composition containing metal of this invention. In another version, the core comprises: i) a thermoset rubber inner core, ii) a first intermediate core layer formed from a HNP composition, iii) a second intermediate core layer formed from the plasticized thermoplastic composition containing metal of this invention, and iv) a thermoset rubber outer core layer. In yet another version, the core comprises: i) a thermoset rubber inner core layer, ii) an intermediate core layer formed from the plasticized thermoplastic composition containing metal of this invention, and iii) an outer core layer formed from a HNP composition. In yet another particular embodiment, the core comprises: i) a thermoset rubber inner core layer, ii) an intermediate core layer formed from the plasticized thermoplastic composition containing metal of this invention, iii) a second intermediate core layer formed from a HNP composition, and iv) a thermoset rubber outer core layer.

Figure 4:
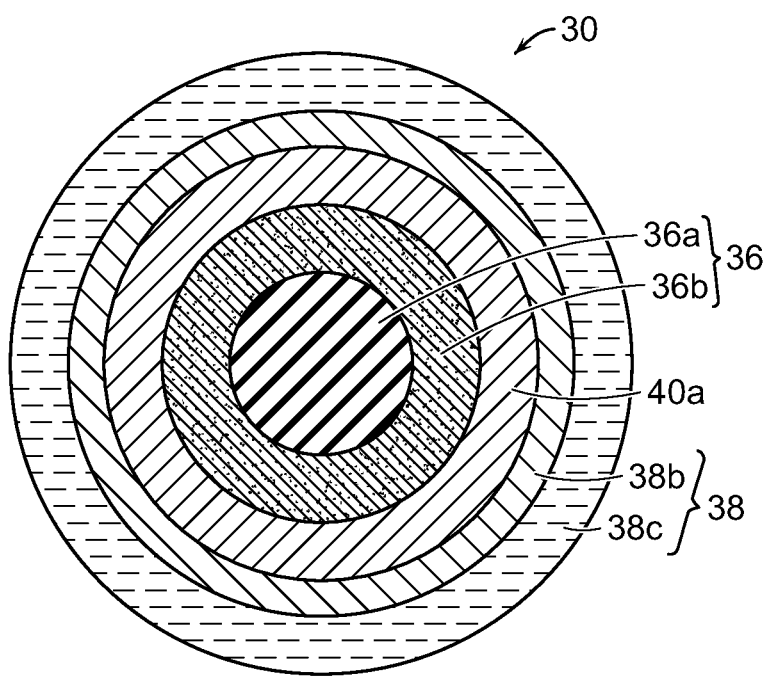
FIG. 4 is a cross-sectional view of a five-piece golf ball having a dual-layered core, an intermediate layer, and a dual-layered cover made in accordance with the present invention.

As discussed above, golf balls having various constructions may be made in accordance with this invention. Preferably, a three-piece golf ball having a dual-core and single-layered cover or a four-piece ball having a dual-core and dual-layered cover is made. It is also recognized that two-layered and five-layered and even six-layered balls. The inner core can be made from a plasticized thermoplastic composition comprising metal material as discussed above. For example, referring to FIG. 3, one version of a golf ball that can be made in accordance with this invention is generally indicated at (24). The ball (24) is a two-piece ball containing a core (26) and surrounding cover (28). In FIG. 4, the golf ball (30) contains a dual-core (36) having an inner core (center) (36a) and outer core layer (36b). The dual-core (36) is surrounded by a multi-layered cover (38) having an inner cover layer (38a) and outer cover layer (38b). An intermediate layer (40) is disposed between the core (36) and cover (38) sub-structures.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR").

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising:
   i) an inner core layer comprising a thermoplastic composition, the inner core having an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient, the first thermoplastic composition comprising:
      a) an acid copolymer of ethylene and an α,β-unsaturated carboxylic acid, optionally including a softening monomer selected from the group consisting of alkyl acrylates and methacrylates;
      b) a plasticizer;
      c) a cation source present in an amount sufficient to neutralize from about 0 to about 100% of all acid groups present in the composition;
      and
      d) a metal material; and
   ii) an outer core layer comprising a thermoset composition, the outer core layer being disposed about the inner core layer and having an outer surface hardness ($H_{outer\ surface\ of\ OC}$) and a midpoint hardness ($H_{midpoint\ of\ OC}$), the $H_{outer\ surface\ of\ OC}$ being the same or less than the $H_{midpoint\ of\ OC}$ to provide a zero or negative hardness gradient,
   wherein the center hardness of the inner core ($H_{inner\ core\ center}$) is in the range of about 10 Shore C to about 70 Shore C and the outer surface hardness of the outer core layer ($H_{outer\ surface\ of\ OC}$) is in the range of about 25 Shore C to about 95 Shore C to provide a positive hardness gradient across the core assembly; and
   iii) a cover having at least one layer disposed about the outer core layer.

2. The golf ball of claim 1, wherein the inner core has a diameter in the range of about 0.100 to about 1.100 inches and a specific gravity ($SG_{inner}$), and the outer core layer has a thickness in the range of about 0.200 to about 1.200 inches, and a specific gravity ($SG_{outer}$), wherein the $SG_{inner}$ is greater than the $SG_{outer}$.

3. The golf ball of claim 1, wherein the inner core layer has a specific gravity in the range of about 1.60 to about 6.25 and the outer core layer has a specific gravity in the range of about 0.60 to about 4.10 g/cc.

4. The golf ball of claim 1, wherein the thermoplastic composition comprises about 1 to about 60% by weight metal material.

5. The golf ball of claim 1, wherein the metal material of the inner core is a metal selected from the group consisting of copper, steel, brass, tungsten, titanium, aluminum, magnesium, molybdenum, cobalt, nickel, iron, tin, bronze, silver, gold, and platinum, and alloys and combinations thereof.

6. The golf ball of claim 1, wherein the thermoplastic composition of the inner core comprises a thermoplastic material selected from the group consisting of ethylene acid copolymer ionomers; polyesters; polyamides; polyamide-ethers, polyamide-esters; polyurethanes, polyureas; fluoropolymers; polystyrenes; polypropylenes and polyethylenes; polyvinyl chlorides; polyvinyl acetates; polycarbonates; polyvinyl alcohols; polyethers; polyimides, polyetherketones, polyamideimides; and mixtures thereof.

7. The golf ball of claim 1, wherein the thermoset composition of the outer core comprises a thermoset rubber selected from the group consisting of polybutadiene, ethylene-propylene rubber, ethylene-propylene-diene rubber, polyisoprene, styrene-butadiene rubber, polyalkenamers, butyl rubber, halobutyl rubber, polystyrene elastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

8. The golf ball of claim 1, wherein the thermoplastic composition comprises about 3 to about 50% by weight plasticizer.

9. The golf ball of claim 1, wherein the plasticizer is a fatty acid ester.

10. The golf ball of claim 1, wherein the plasticizer is an alkyl oleate.

11. The golf ball of claim 1, wherein the plasticizer is ethyl oleate.

* * * * *